United States Patent
Defrancq

(10) Patent No.: US 11,277,954 B2
(45) Date of Patent: Mar. 22, 2022

(54) HITCH DEVICE FOR AGRICULTURAL VEHICLE

(71) Applicant: Hubert Defrancq, Guignicourt (FR)

(72) Inventor: Hubert Defrancq, Guignicourt (FR)

( * ) Notice: Subject to any disclaimer, the term of this patent is extended or adjusted under 35 U.S.C. 154(b) by 368 days.

(21) Appl. No.: 16/496,058

(22) PCT Filed: Mar. 22, 2018

(86) PCT No.: PCT/EP2018/057294
§ 371 (c)(1),
(2) Date: Sep. 20, 2019

(87) PCT Pub. No.: WO2018/172458
PCT Pub. Date: Sep. 27, 2018

(65) Prior Publication Data
US 2020/0107485 A1    Apr. 9, 2020

(30) Foreign Application Priority Data
Mar. 24, 2017  (FR) ...................................... 1752449

(51) Int. Cl.
*A01B 59/06*    (2006.01)
*A01B 59/042*   (2006.01)

(52) U.S. Cl.
CPC .......... *A01B 59/066* (2013.01); *A01B 59/042* (2013.01)

(58) Field of Classification Search
CPC .... A01B 59/066; A01B 59/042; A01B 59/043
See application file for complete search history.

(56) References Cited

U.S. PATENT DOCUMENTS

| 2,222,827 A * | 11/1940 | Zuger ...................... B60D 1/14 |
| | | 280/464 |
| 2,816,777 A * | 12/1957 | Lehr .................... A01B 59/042 |
| | | 172/679 |
| 3,001,590 A * | 9/1961 | Tsuchiya ................ A01B 35/14 |
| | | 172/451 |

(Continued)

FOREIGN PATENT DOCUMENTS

| EP | 2 283 719 A2 | 2/2011 |
| NL | 1 020 444 C2 | 10/2003 |
| WO | 2016041547 A1 | 3/2016 |

OTHER PUBLICATIONS

French Search Report dated Dec. 5, 2017, in corresponding French Application 1752449.

(Continued)

*Primary Examiner* — Tara Mayo-Pinnock
(74) *Attorney, Agent, or Firm* — Nixon & Vanderhye

(57) ABSTRACT

A hitch device for an implement is capable of being mounted on an agricultural vehicle, including: a first chassis extending in a vertical plane, the normal to which is substantially the direction of travel of the hitch; a second chassis also extending in the vertical plane and mounted with capacity for translational movement on the first chassis in the transverse direction with respect to the direction of travel of the hitch; an actuator causing the translational movement of the second chassis with respect to the first chassis; an attachment device for fixing the first chassis to the rear of the agricultural vehicle; and a system for attaching an agricultural implement, the system allowing the implement to pivot about the vertical.

20 Claims, 6 Drawing Sheets

(56) References Cited

U.S. PATENT DOCUMENTS

| | | | | | |
|---|---|---|---|---|---|
| 4,019,753 | A | * | 4/1977 | Kestel | A01B 59/062 |
| | | | | | 172/448 |
| 5,645,179 | A | * | 7/1997 | Mohar | A01B 23/046 |
| | | | | | 212/180 |
| 5,860,764 | A | * | 1/1999 | Roberts | E01C 19/236 |
| | | | | | 404/93 |
| 5,931,234 | A | | 8/1999 | Trowbridge | |
| 8,246,271 | B2 | * | 8/2012 | Verhoff | E01C 19/38 |
| | | | | | 404/117 |
| 9,913,422 | B2 | * | 3/2018 | Mitchel et al. | A01B 63/004 |
| 2017/0290258 | A1 | * | 10/2017 | Mollick | A01B 59/002 |

OTHER PUBLICATIONS

International Search Report dated Jun. 25, 2018, in corresponding PCT application PCT/EP2018/057294.

* cited by examiner

HITCH DEVICE FOR AGRICULTURAL VEHICLE

The present invention relates to the field of technical vehicles and in particular to a hitch and lifting device for an agricultural implement, suitable for being mounted on an agricultural vehicle, and more particularly at the rear of the vehicle.

The present invention more particularly relates to the lateral adjustment of the position of the agricultural implements towed by a vehicle able to laterally vary the position of the implement in response to a geolocation signal so as to reliably maintain a preselected path.

Agriculture developed in terms of precision thanks to the advent of navigation satellite systems such as GPS. By using a GPS facility, a farmer can thus locate a precise position in a field, which enables the farmed areas to be mapped with precision, according to a great number of parameters such as the yield of the crops, topography, organic matter content, moisture level, nitrogen rate, pH and others. Manufacturers of precision equipment started to supply automated steering systems which use GPS signals to steer an agricultural vehicle and especially a tractor, on a predetermined path. Although such equipment operate properly to guide the agricultural vehicle reliably and precisely, variations in soils and in topography limit the reliable and precise positioning of the towed implements.

Several solutions to control geolocation of an agricultural implement towed to a tractor have been considered.

Such solutions are linked to the drawbar of the tractor or to both lower points of the rear hitch. These solutions consist in a fixed connection to the tractor by means of a drawbar or two or three fixing points, and an interface to move the implement transversally, as a function of the geolocation signal, in order for the implement to follow the same direction as the tractor.

According to a first approach, the moving interface of the implement makes the latter rotate around a vertical axis. In order to work, the rear hitch of the tractor must have a free swinging arm capacity. The implement must be fitted with a device engaged in the soil (essentially at least one disk) which produces a lateral force to move the implement in the desired direction. This correction system is however sensitive to the soil topology and to the ground declivity.

According to a second approach, the moving interface for the implement makes the latter translate laterally. In order to work, the rear hitch of the tractor must be locked, without a possible swinging arm. However, this type of solutions is not compatible with implements deeply engaged in the soil.

One solution was then to fit the interface with anchors, against which a moving reaction is applied to move the working unit towards the side, whereas the rear hitch of the tractor has a free swinging arm capacity. These arrangements are however not applicable to implements with a low traction and with a low anchoring level in the soil.

Another solution described in document WO2016041547A1 is to modify the hitch by varying the length of the arms by means of a jack in order to enable the rotation of the interface in addition to the translation of the implement. However, this solution requires the modification of standard hitches and induces a complex control of the simultaneous motions of the hitch and of the interface.

To sum up, there are guiding systems consisting in moving laterally the agricultural vehicle for the implement to follow the desired trajectory in spite of its shifts with respect to the vehicle. However, these systems are not adapted to the lateral instabilities which occur so quickly that the vehicle does not have time to counterbalance laterally, given its travel direction.

This is the reason why it has proven necessary to develop a solution which can adapt to the standards of agricultural vehicles without requiring a modification. It also seemed necessary for this solution to be compatible with implements with a great anchoring level in the soil.

The principle is to move laterally the agricultural implement with respect to the agricultural vehicle to counterbalance the offset of the point of convergence so that the implement remains positioned with respect to its desired trajectory, and this, in spite of the lack of symmetry of the soil and of the relief.

Thus, the object of the invention is to move laterally the hitch, which the agricultural vehicle cannot do, while keeping the flexibility of a link enabling the self-alignment of the hitch.

More precisely the object of the invention is a hitch device for an implement, suitable for being mounted on an agricultural vehicle, characterised in that it comprises:

a first chassis extending in a vertical plane, the normal of which is substantially the travel direction of the hitch, a second chassis also extending in the vertical plane and translatably mounted on the first chassis along the transverse direction defined with respect to the travel direction of the hitch, means (82, 82a, 82b) for actuating the translation of the second chassis with respect to the first chassis, a device for fixing the first chassis at the rear of the agricultural vehicle, a system for hooking up an agricultural implement to the second chassis, said system being able to swivel freely around a vertical axis, with respect to the second chassis.

The hooking up device can comprise two hooking elements disposed at the lower part of the second chassis, symmetrically with respect to a median plane, said hooking elements extending along the opposite direction to the travel direction of the hitch.

The hooking elements located at the lower part of the second chassis can also be swivelling around an axis of the second chassis extending transversally, and retained by means of levelling rods.

The swivelling alpha angle of both hooking elements around the vertical axis can be between 0 and +/−30°, and preferably between 0 and +/−8°.

The hooking element swivelling around the vertical axis can be controlled by at least one jack, said at least one jack being able to work according to a first mode corresponding to the free rotation of the hooking elements around the vertical and a second mode in which the rotation of the hooking elements around the vertical is locked.

The hooking up device can further comprise a third hooking element located at the upper part of the second chassis, said hooking element acting as a retaining element for the agricultural implement.

The fixing device of the first chassis at the rear of the agricultural vehicle can be a three-point lifting system including at the bottom part, two hinged arms mounted at one of their ends on an axis of the agricultural vehicle and at the other of their ends on the first chassis, and at the top part a linking element between the upper part of the first chassis and the agricultural vehicle, the arms being controlled by lifting means.

The second chassis can include two arms extending vertically and connected at their upper end by a body, their lower end being each slidably mounted along a pair of coaxial axes provided on the first chassis and extending in the vertical plane along the transverse direction, whereas the body of the second chassis is extended by a retaining element slidably mounted along an axis provided on the first chassis and also extending in the vertical plane along the transverse direction.

The second chassis can include two arms extending vertically and connected at their middle part by a body, their lower and upper ends being each respectively slidably mounted along a pair of coaxial axes provided on the first chassis and extending in the vertical plane along the transverse direction.

The means for actuating the translation of the second chassis with respect to the first chassis can comprise two single-acting jacks mounted on either side of the body of the second chassis.

The means for actuating the translation of the second chassis with respect to the first chassis can comprise a double-acting jack mounted on one side of the second chassis.

The free space between both arms of the second chassis can define a passage for the power cables of the means for actuating the translation of the second chassis with respect to the first chassis, as well as for the drive line driving the agricultural implement.

The hitch device can further comprise a sensor to identify the position of the second chassis with respect to the first chassis.

Further advantages and features of the invention will appear upon reading the detailed description of implementations and of embodiments which are in no way limiting, and of the following appended drawings.

In accordance with a principle of the invention, the device for hitching an agricultural implement to a tractor type vehicle comprises:

a first chassis 6 extending in a vertical plane and the normal (also called perpendicular) of which is substantially the travel direction of the hitch, a second chassis 8 also extending in a vertical plane and translatably mounted on the first chassis along the transverse direction (that is laterally) with respect to the travel direction of the hitch, means 82, 82a, 82b for actuating the translation of the second chassis with respect to the first chassis, a device for fixing the first chassis at the rear of the agricultural vehicle, a system for hooking up an agricultural implement, said system enabling said implement to swivel around the vertical.

Figure 1:
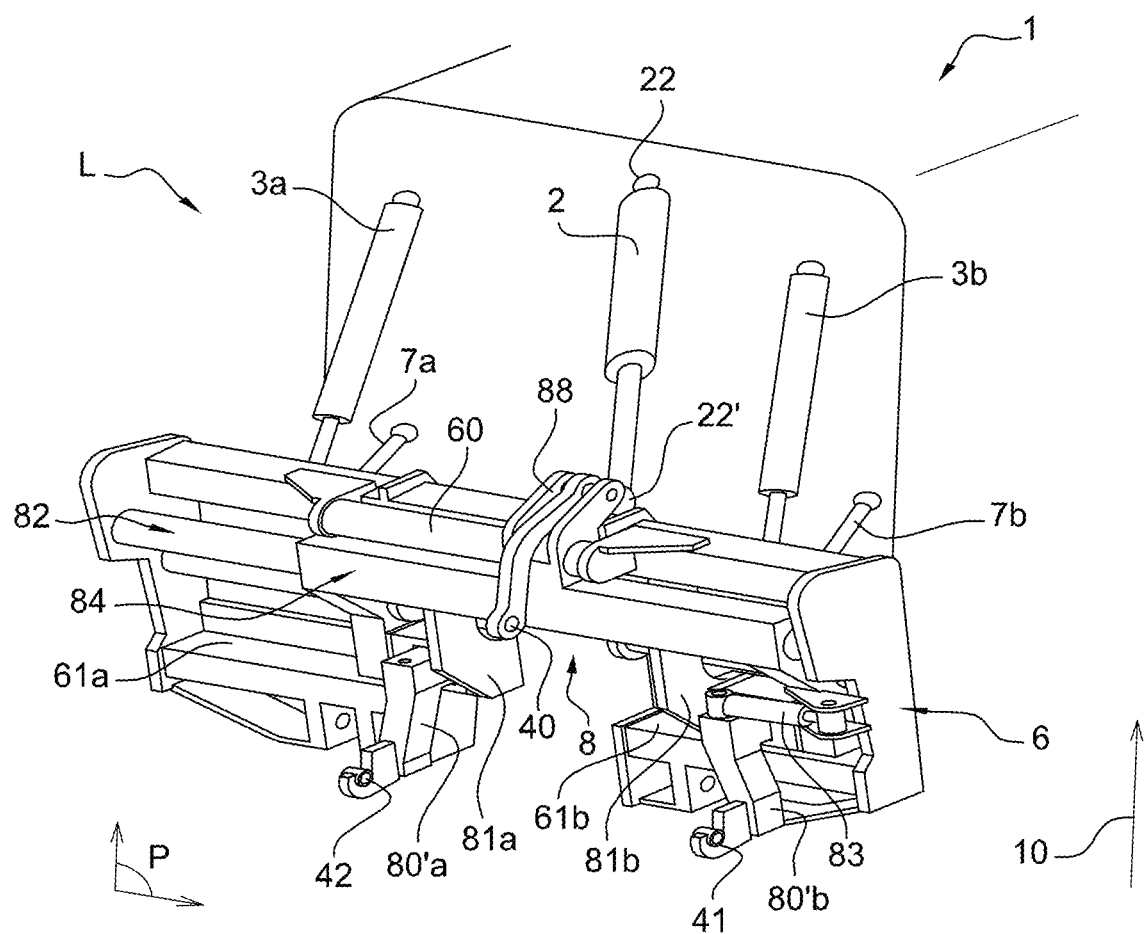
FIG. 1 is a view of an assembly comprising a hitch device according to the invention fixed on an agricultural vehicle.

FIG. 1 represents a hitch device mounted on an agricultural vehicle 1. It comprises a first chassis 6 having a substantially planar shape and extending in a vertical plane P comprising the vertical axis 10, also called "the vertical". The vertical plane P corresponds to the plane the normal of which is the travel direction of the hitch. In other words, this direction is perpendicular to the plane P and corresponds to the advance direction of the tractor. The hitch device also comprises a second chassis 8 which also extends in the vertical plane P. The second chassis is translatably mounted on the first chassis along a transverse direction (that is laterally) with respect to the travel direction of the hitch.

The hitch device comprises a device for fixing the first chassis 6 at the rear of the agricultural vehicle. This fixing device does not enable a swinging arm lateral motion of the hitch with respect to the agricultural vehicle.

Such as represented in FIG. 1, the device for fixing the first chassis at the rear of the agricultural vehicle is a lifting device L connecting the first chassis to the agricultural vehicle and enabling the first and the second chassis, and consequently the agricultural implement, to be lifted with respect to the vehicle.

The lifting system can advantageously be a three-point system including at the bottom part, two hinged arms 7a, 7b mounted at one of their ends on an axis of the agricultural vehicle and at the other of their ends on the first chassis 6.

Figure 3:
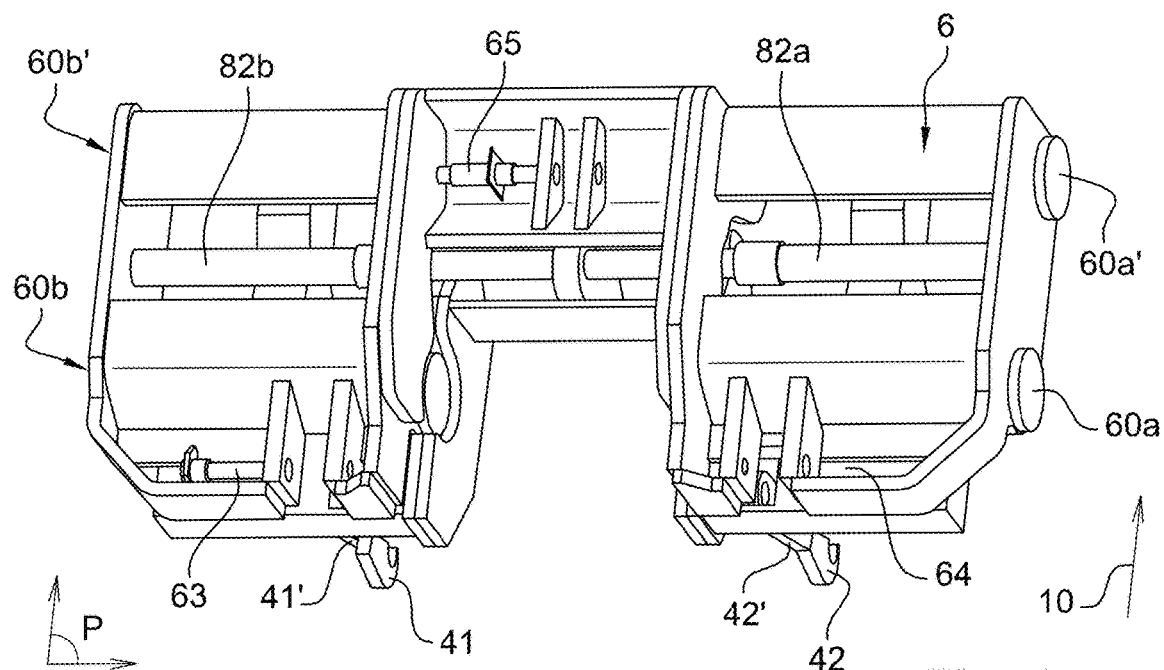
FIG. 3 is a three quarter view from a front side of the first embodiment of a hitch device according to the invention.

FIG. 3 shows for example two axes 63, 64 of the first chassis 6 located at the bottom part, on which the ends of the lower hinged arms 7a, 7b can be mounted.

Similarly, at the top part, the lifting system comprises a linking element between the upper part of the first chassis 6 and the agricultural vehicle. This linking element can consist in another arm 2 fixed at one of its ends at a hinging point 22 to the agricultural vehicle and at the other of its ends on a hinging point 22' of the second chassis.

FIG. 3 shows for example an axis 65 of the first chassis 6 located at the top part, on which the end of the upper arm 2 can be mounted.

The mounting and translation of the second chassis with respect to the first chassis will now be detailed.

Figure 2:
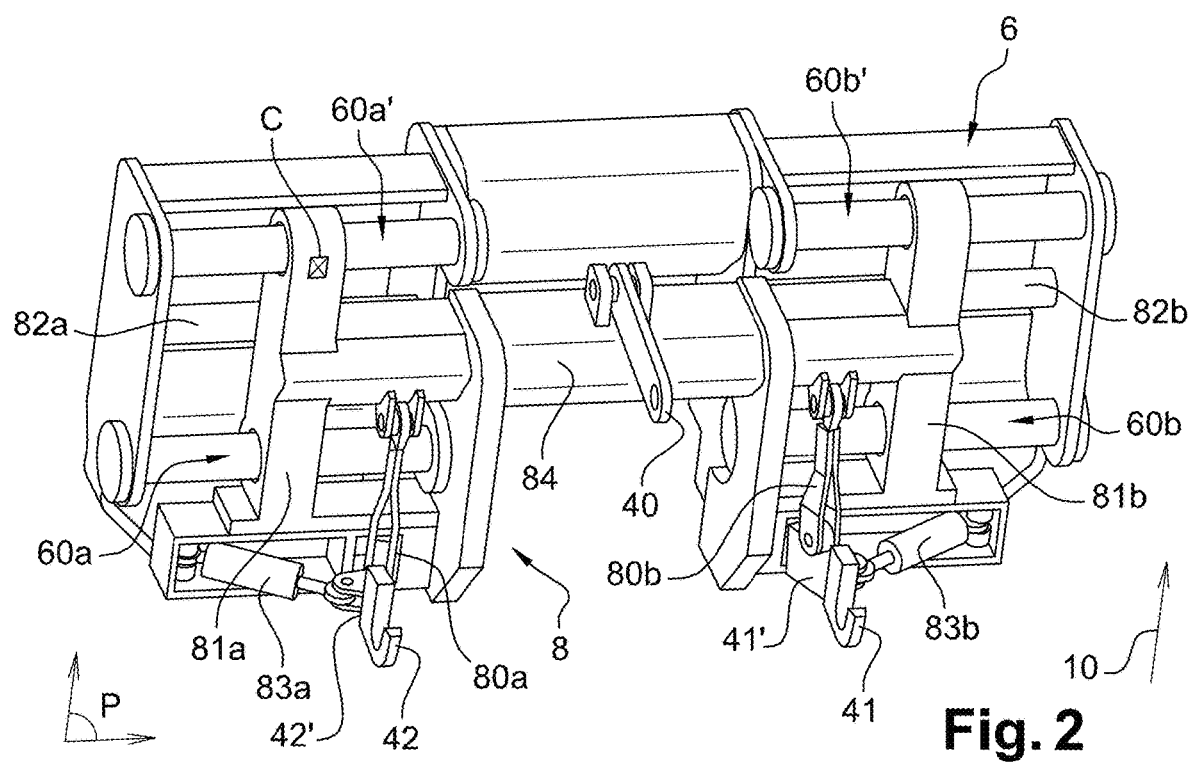
FIG. 2 is a three quarter view from a rear side of a first embodiment.

According to a first embodiment described in FIGS. 2 and 3, the second chassis 8 includes two arms 81a, 81b which extend in the vertical plane P. These two arms are connected, substantially at their middle part, by a body 84 extending transversally in the vertical plane P.

The lower end of each of the arms 81a, 81b is slidably mounted, for example by means of a hole made in said end, on the fixed axes 60a, 60b provided on the first chassis 6. These axes are coaxial to each other and extend transversally in the vertical plane P.

Similarly, the upper end of each of the arms 81a, 81b is also slidably mounted, for example by means of a hole made in said end, on a fixed axis 60'a, 60'b provided on the first chassis 6. These axes are coaxial to each other and extend transversally in the vertical plane P.

The means 82a, 82b for actuating the translation of the second chassis with respect to the first chassis are two single-acting jacks mounted on the first chassis on either side of the body 84 of the second chassis.

According to a non-represented alternative, these actuating means could also consist in a single double-acting jack mounted on the first chassis.

In the first embodiment described in FIGS. 2 and 3, the system for hooking up the agricultural implement comprises two hooking elements 41, 42 which are fixed at the lower part of the second chassis, on either side of the median plane.

These hooking elements are mounted on lugs 41', 42' which extend from the lower end of the arms 81a, 81b of the second chassis along the opposite direction to the travel direction of the hitch, that is rearwards. These hooking elements can be hooks, pawls, or any fixing piece.

The lugs 41', 42' extended by the hooking elements 41, 42 are mounted according to a swivel link around the vertical axis 10 at the lower part of the second chassis. Thus, when the second chassis performs a translation with respect to the first chassis, the swivelling enabled by the free motion of the hooking elements enables the translation to be performed without inducing a stress which would disturb the trajectory of the agricultural vehicle and without imposing excessive lateral stresses to the agricultural implement. The latter continuously self-balances during the offset motion of the second chassis and repositions itself on the desired trajectory without mechanical stresses disturbing the travel of the agricultural vehicle. The convergence allowed between the directions carried by the hooking elements leads to a slight rotation of the agricultural implement which facilitates its offset motion and which stabilises it in its natural trajectory.

The allowed swivelling angle around the vertical axis 10 is generally between 0 and +/−30°, and preferably between 0 and +/−8°.

Advantageously and according to the embodiment described in FIGS. 2 and 3, the swivelling around the vertical axis 10 of the hooking elements 41, 42 is controlled by means of two jacks 83a, 83b, each of said jacks being respectively associated with one of the hooking elements 41, 42. This configuration helps to maintain the distance between the hooking elements 41, 42 thus facilitating a rigid coupling of the agricultural implement with the second chassis.

According to another alternative, the swivelling around the vertical axis 10 of the hooking elements 41, 42 could be controlled by means of a single jack therefore associated with a single hooking element 41 or 42. In this configuration, the swivelling of the hooking element controlled by the jack results in the swivelling of the other hooking element through the deviation of the frame of the agricultural implement itself.

The control of the swivelling of the hooking elements 41, 42 by means of one or two jacks thus enables the agricultural implement to be put back in the axis of the travel direction. Indeed, when it is required to lift the implement, it is necessary to replace the whole hitch in the axis of the travel direction and to prevent its swivelling and consequently random lateral movements.

By way of example, FIGS. 7A, 7B, 8A and 8B represent exemplary implementations of a jack to control the swivelling of the hooking elements 41, and 42.

Figure 7A:
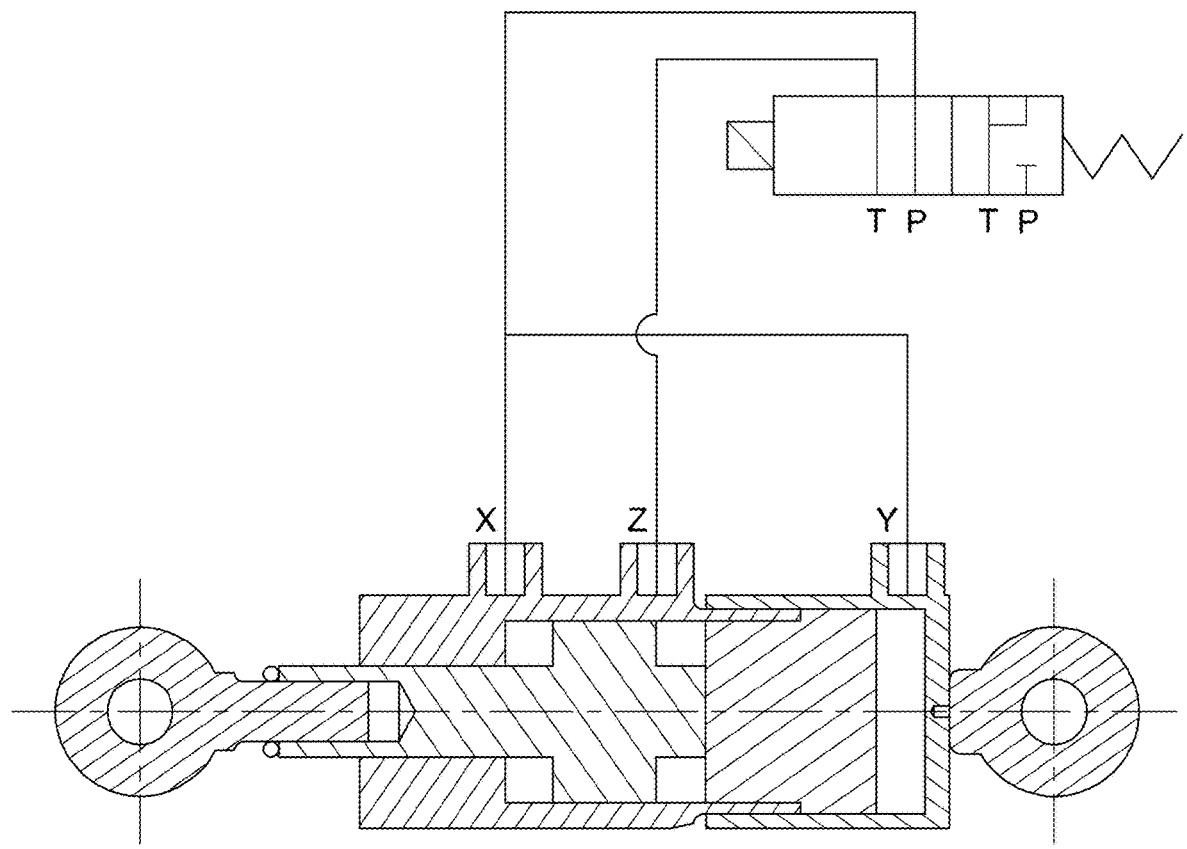
FIGS. 7A, 7B, 8A, 8B are views of a detail of an improvement of the invention.
Figure 7B:
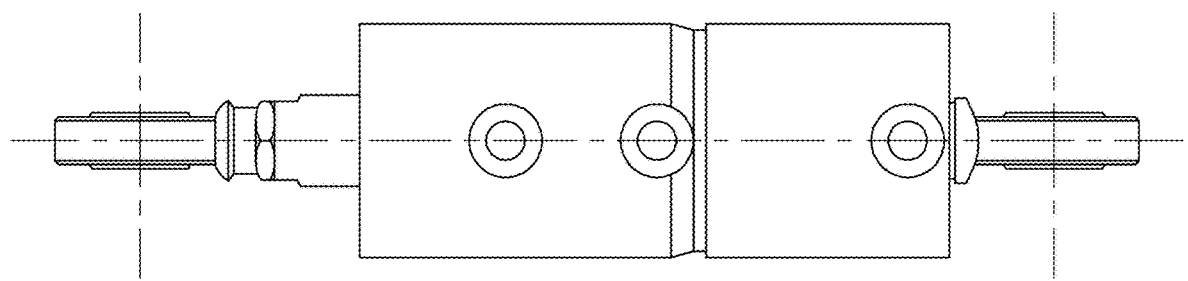

FIGS. 7A and 7B describe a view along a longitudinal section for the first figure and a top view for the second figure of a jack provided at each of its ends with a ball joint and three entries X, Y and Z defining three chambers. According to a first embodiment, only the entries X and Y are supplied with a pressurised fluid. The free rotation of the hooking elements is then locked. According to a second embodiment, none of the entries is supplied with a pressurised fluid. The translation of the piston thus remains free.

Figure 8A:
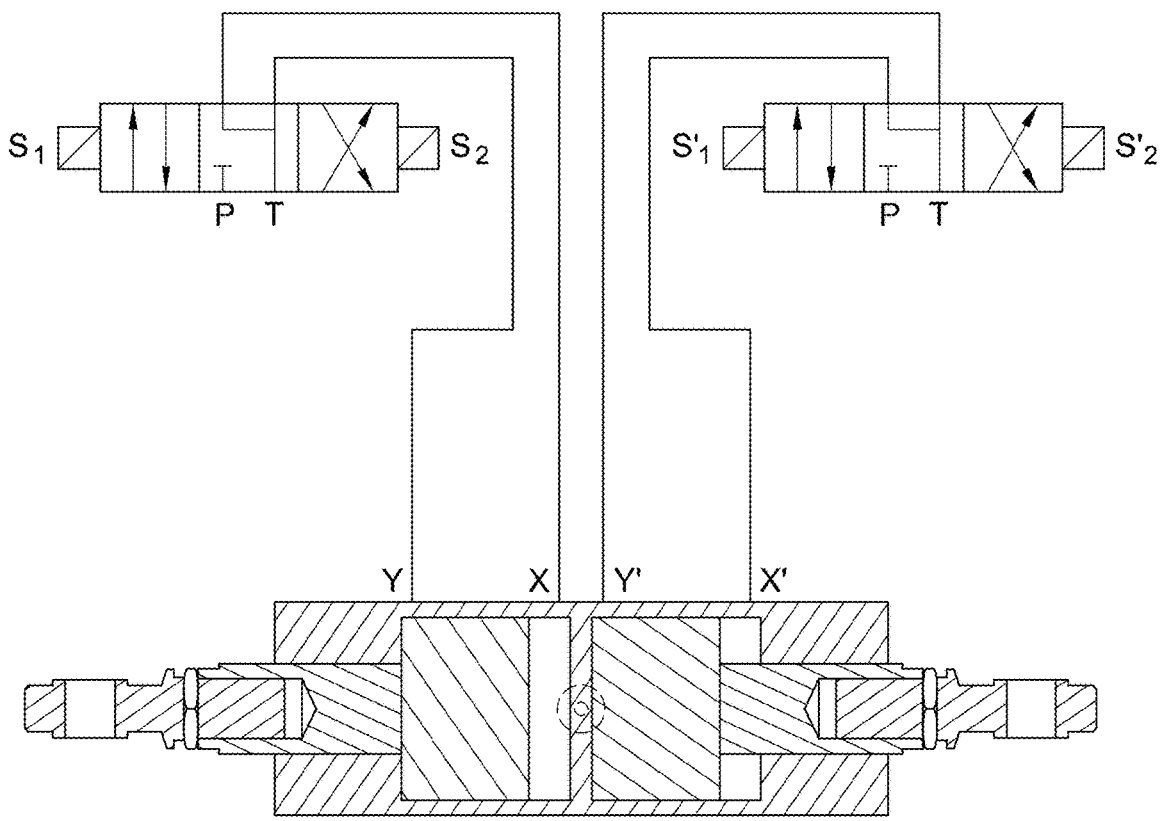
Figure 8B:
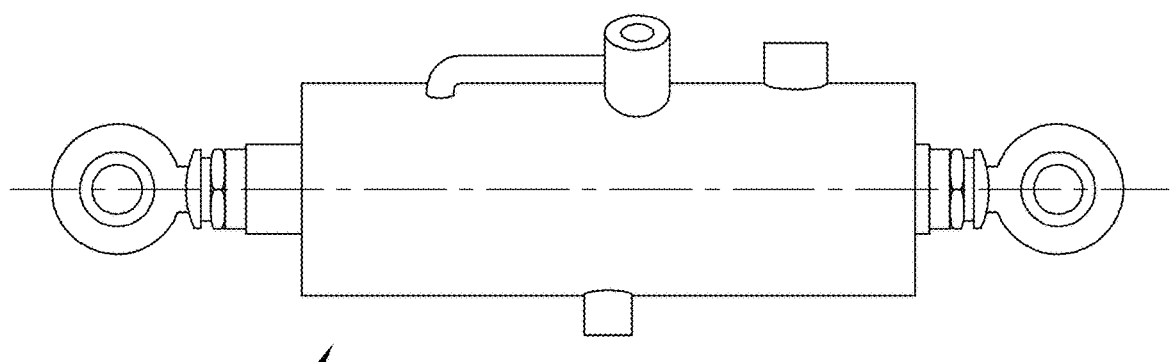

FIGS. 8A and 8B describe a view along a longitudinal section for the first figure and a top view for the second figure of a double-acting jack provided at each of its ends with a ball joint and with twice two entries X, Y and X', Y' defining each time two chambers. According to a first embodiment in which the valves S1 and S1' are activated, only the entries X and X' are supplied with a pressurised fluid. The free rotation of the hooking elements is then locked. According to a second embodiment in which the valves are at a neutral point, none of the entries is supplied with a pressurised fluid. The translation of the piston thus remains free. This double-acting jack further enables a third embodiment in which, when the valves S2 and S1' are activated, the jack actuates a motion to the right. A fourth embodiment corresponding to the actuation of the motion to the left is possible when the valves S1 and S2' are activated.

Advantageously and so as to enable the implement to find naturally its traction balance point, the lugs 41', 42' which extend the hooking elements 41, 42, located at the lower part of the second chassis can thus swivel along the transverse direction, that is around the transverse axis.

Advantageously, the hooking elements 41, 42 located at the lower part of the second chassis are retained by levelling rods 80a, 80b.

Advantageously, a further hooking element 40 located at the upper part of the second chassis, can be added in order to retain the implement during lifting so that said implement can be fully raised.

So as to follow the swinging arm motions of the agricultural implement (these motions being inscribed in the horizontal plane), the hooking element 40 located at the upper part of the second chassis can thus swivel around the vertical axis 10. To do so, the hooking element 40 can be fixed at the upper part of the second chassis and of the agricultural implement by means of a ball joint for example.

Figure 4:
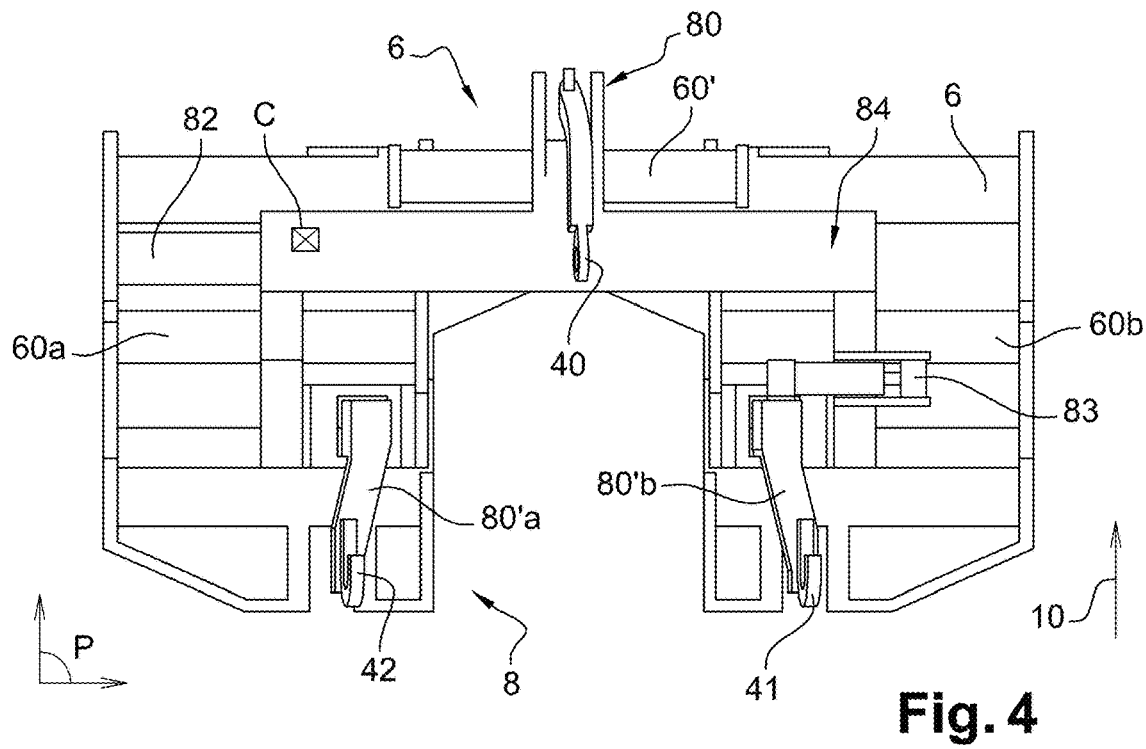
FIG. 4 is a front view from the rear side of a second embodiment.
Figure 5:
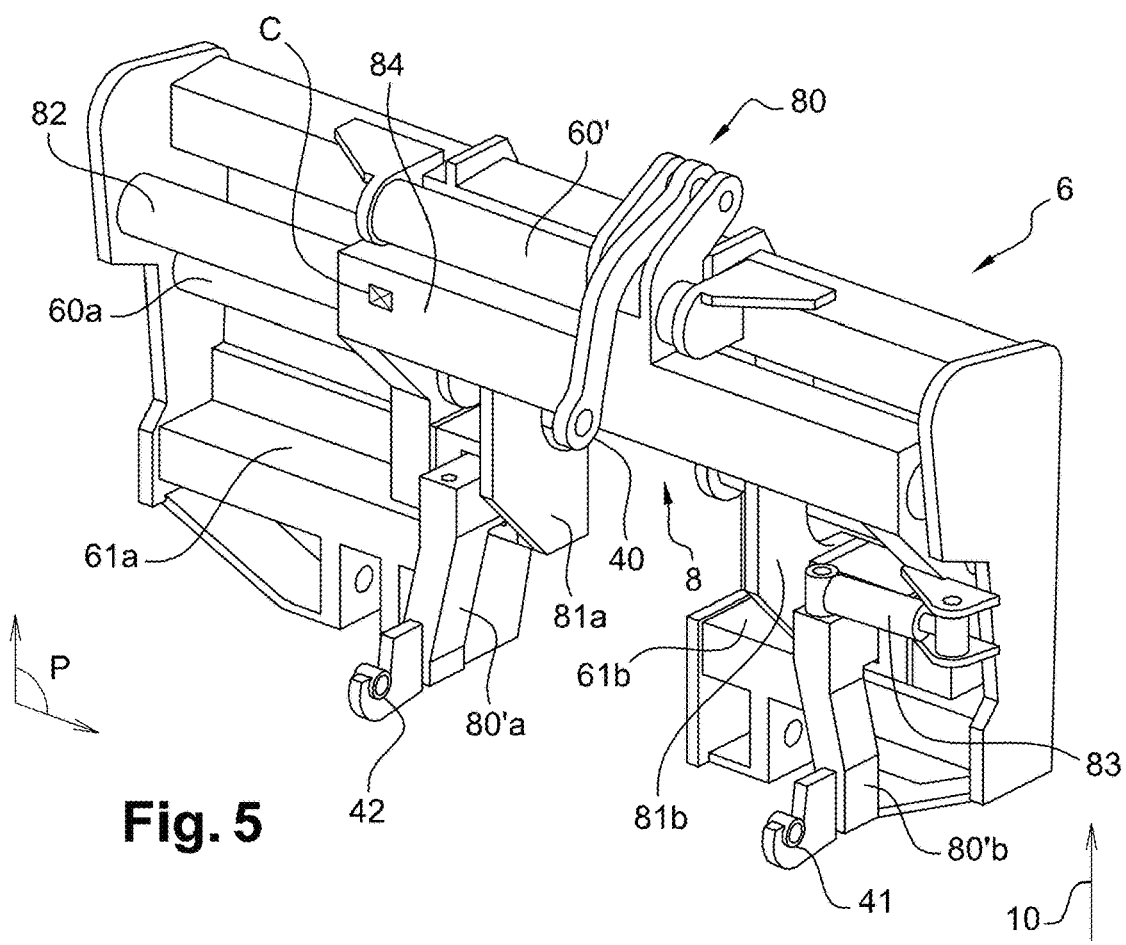
FIG. 5 is a three quarter view from the rear side of the second embodiment.

According to a second embodiment described in FIGS. 4 and 5, the second chassis 8 includes two arms 81a, 81b extending in the vertical plane P. These two arms are connected at their upper end by a body 84, extended by a retaining element 80 slidably mounted along an axis 60' provided on the first chassis. Each of the lower ends of both arms 81a, 81b is slidably mounted, for example by means of a hole made in said end, on a fixed axis 60a, 60b provided on the first chassis 6, said axis extending transversally in the vertical plane P.

The means 82 for actuating the translation of the second chassis with respect to the first chassis consist in a single double-acting jack mounted on the first chassis.

According to an alternative, these actuating means could also consist in two single-acting jacks mounted on the first chassis on either side of the body 84 of the second chassis.

In the second embodiment described in FIGS. 4 and 5, the system for hooking up the agricultural implement comprises, just like in the first embodiment, two hooking elements 41, 42 which are fixed at the lower part of the second chassis, on either side of the median plane.

These hooking elements are fixed to lugs 80'a, 80'b which extend from the lower end of the arms 81a, 81b of the second chassis. These hooking elements can be hooks, pawls, or any other fixing piece.

The lugs 80'a, 80'b are mounted according to a swivelling connection around the vertical axis 10 at the lower part of the second chassis. Thus, when the second chassis performs a translation with respect to the first chassis, the swivelling enabled by the free motion of the hooking elements enables the translation to be performed without inducing a stress which would disturb the trajectory of the agricultural vehicle and without imposing excessive lateral stresses to the agricultural implement. The latter continuously self-balances during the offset movement of the second chassis and repositions itself on the desired trajectory without the mechanical stresses disturbing the travel of the agricultural vehicle. The convergence allowed between the directions carried by the hooking elements results in a slight rotation of the agricultural implement which facilitates its offset motion and which stabilises it in its natural trajectory.

The swivelling angle allowed around the vertical axis 10 is generally between 0 and +/−30°, and preferably between 0 and +/−8°.

Advantageously and according to the embodiment described in FIGS. 2 and 3, the swivelling around the vertical axis 10 of the hooking elements 41, 42 is controlled by means of a jack 83 associated with one of the hooking elements 41. In this configuration, the swivelling of the hooking element controlled by the jack leads to the swivelling of the other hooking element through the deviation of the frame of the agricultural implement itself. This configuration helps to maintain the distance between the hooking elements 41, 42 thus facilitating a rigid coupling of the agricultural implement with the second chassis.

According to another alternative, the swivelling around the vertical axis 10 of the hooking elements 41, could be controlled by means of two jacks each associated with one of the hooking elements 41, 42.

Controlling the swivelling of the hooking elements 41, 42 by means of one or two jacks thus enables the agricultural implement to be put back in the axis of the travel direction. Indeed, when it is required to lift the implement, it is necessary to replace the whole hitch in the axis of the travel direction and to prevent its swivelling and consequently random lateral movements.

Regarding the control of the swivelling of the hooking elements 41, 42, the implementation of the jacks represented in FIGS. 7A, 7B, 8A and 8B is applicable just like in the previous embodiment.

Advantageously, a further hooking element 40 swivellingly mounted on the retaining element, is provided so as to retain the implement during lifting and so that said implement can be fully raised.

So as to follow the swinging arm motions of the agricultural implement (these motions being inscribed in the horizontal plane), the hooking element 40 located at the upper part of the second chassis can thus swivel around the vertical axis 10. To do so, the hooking element 40 can be fixed at the upper part of the second chassis and of the agricultural implement by means of a ball joint connection for example.

In the first embodiment as in the second embodiment, and in order to control the translation of the second chassis with respect to the first chassis accurately, the second chassis advantageously includes a feedback sensor C which enables the translation of the second chassis to be adjusted and the deviations to be corrected with respect to the set point position.

Advantageously and such as represented in the first embodiment as in the second embodiment, the passage for the power cables of the actuating means 82, 82a, 82b which enables the translation of the second chassis with respect to the first chassis, is made through the free space defined between both arms of the second chassis.

This free space can also advantageously be used for the passage of the mechanical drive line driving the agricultural implement and secondarily be used for the passage of hydraulic and/or electrical cables.

Thus, both embodiments illustrate the principle of the invention which is precisely to move the second chassis with respect to the first chassis in order to reposition the agricultural implement with respect to the trajectory defined by the GPS system. The swivelling freedom of the hooking elements enables the transition of the agricultural implement during its repositioning and enables it to move forward without creating an abnormal lateral stress in the hitch and implement structures.

Figure 6:
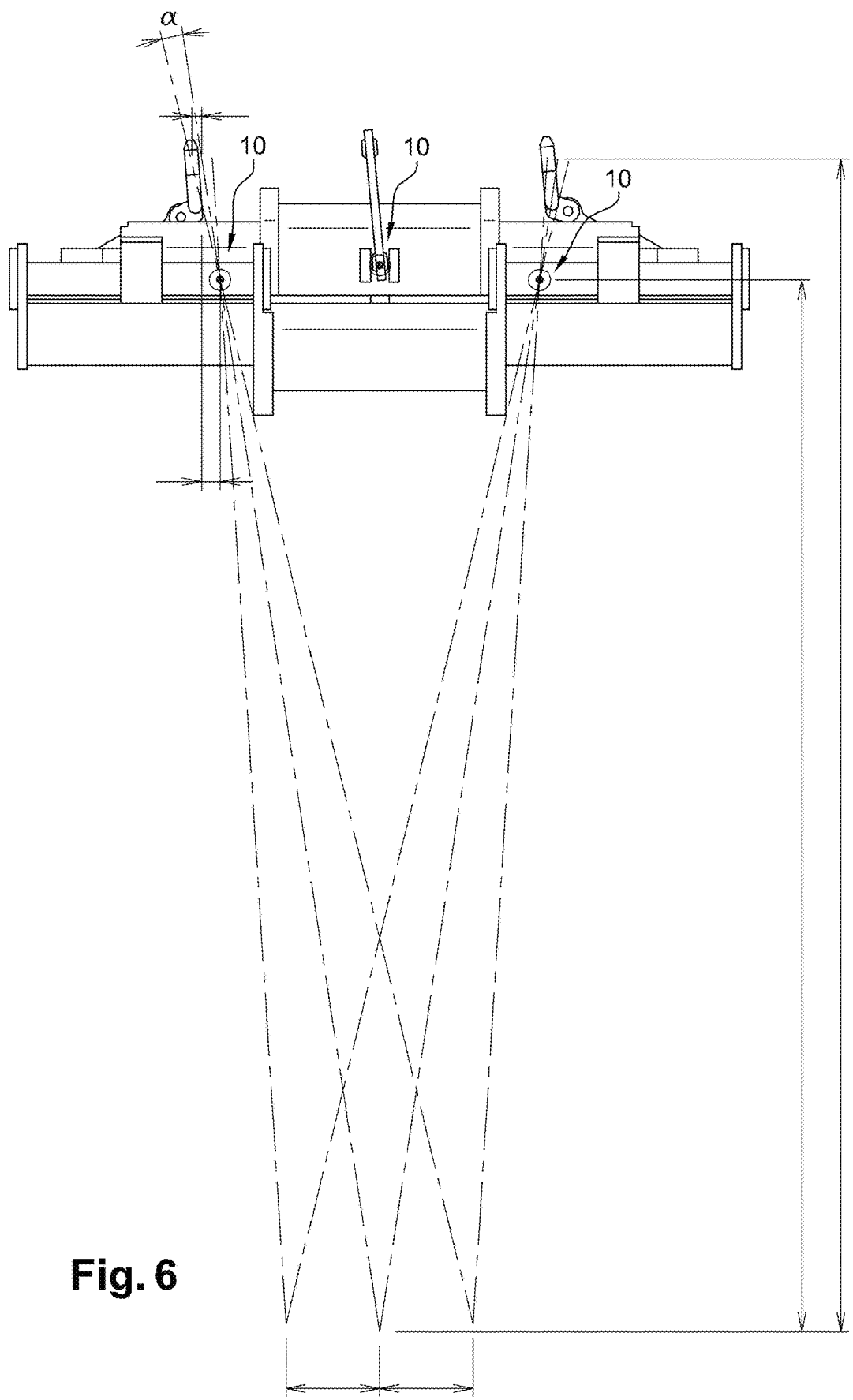
FIG. 6 is a top view of a hitch device according to the invention.

FIG. 6 shows that the traction point moves laterally, when the hooking elements swivel. This angle corresponds to the deviation of the agricultural implement with respect to the line of pull or when the second chassis is in translation with respect to the first chassis. This consequently amount to towing the implement with an angle of pull which facilitates its recentring.

This dissociation between the agricultural implement and the tractor enables the implement to be recentred on its line of balancing force and of pull without imposing a rigidity stress which would be detrimental to the capacity of the tractor to maintain its trajectory, including in the curves or the slopes.

Furthermore this layout prevents the transmission to the agricultural vehicle of the lateral pulses related to the lacks of symmetry of the relief or of the pull force.

FIG. 6 also describes the geometry of the hitch such as recommended by the standard ISO 730.

The invention claimed is:

1. A hitch device for an implement, suitable for being mounted on an agricultural vehicle (1), comprising:
    a first chassis (6) extending in a vertical plane (P), the normal of which is substantially the travel direction of the hitch,
    a second chassis (8) also extending in the vertical plane (P) and translatably mounted on the first chassis along the transverse direction defined with respect to the travel direction of the hitch,
    means (82, 82a, 82b) for actuating the translation of the second chassis with respect to the first chassis,
    a device for fixing the first chassis at the rear of the agricultural vehicle,
    a system for hooking up an agricultural implement to the second chassis, said system being able to swivel freely around a vertical axis (10), with respect to the second chassis.

2. The hitch device for an implement according to claim 1, wherein the hooking up device comprises two hooking elements (41, 42) disposed at the lower part of the second chassis, symmetrically with respect to the vertical median plane, said hooking elements extending along the opposite direction to the travel direction of the hitch.

3. The hitch device for an implement according to claim 2, wherein the hooking elements (41, 42) located at the lower part of the second chassis are also swivelling around an axis of the second chassis extending transversally, and retained by means of levelling rods (80a, 80b).

4. The hitch device for an implement according to claim 3, wherein the swivelling alpha angle of both hooking elements (41, 42) around the vertical axis (10) is between 0 and +/−30°.

5. The hitch device for an implement according to claim 4, wherein the swivelling of the hooking elements around the vertical axis (10) is controlled by at least one jack (83, 83a, 83b), said at least one jack being able to work according to a first mode corresponding to the free rotation of the hooking elements (41, 42) around the vertical and a second mode in which the rotation of the hooking elements (41, 42) around the vertical axis is locked.

6. The hitch device for an implement according to claim 4, wherein the hooking up device further comprises a third hooking element (40) located at the upper part of the second chassis, said hooking element acting as a retaining element for the agricultural implement.

7. The hitch device for an implement according to claim 3, wherein the swivelling of the hooking elements around the vertical axis (10) is controlled by at least one jack (83, 83a, 83b), said at least one jack being able to work according to a first mode corresponding to the free rotation of the hooking elements (41, 42) around the vertical and a second mode in which the rotation of the hooking elements (41, 42) around the vertical axis is locked.

8. The hitch device for an implement according to claim 7, wherein the hooking up device further comprises a third hooking element (40) located at the upper part of the second chassis, said hooking element acting as a retaining element for the agricultural implement.

9. The hitch device for an implement according to claim 3, wherein the swivelling alpha angle of both hooking elements (41, 42) around the vertical axis (10) is between 0 and +/−8°.

10. The hitch device for an implement according to claim 3, wherein the hooking up device further comprises a third hooking element (40) located at the upper part of the second chassis, said hooking element acting as a retaining element for the agricultural implement.

11. The hitch device for an implement according to claim 2, wherein the hooking up device further comprises a third hooking element (40) located at the upper part of the second chassis, said hooking element acting as a retaining element for the agricultural implement.

12. The hitch device for an implement according to claim 2, wherein the device for fixing the first chassis at the rear of the agricultural vehicle is a three-point lifting system L including at the bottom part, two hinged arms (7a, 7b) mounted at one of their ends on an axis of the agricultural vehicle and at the other of their ends on the first chassis, and at the top part a linking element (2) between the upper part of the first chassis and the agricultural vehicle, the arms (7a, 7b) being controlled by lifting means (3a, 3b).

13. The hitch device for an implement according to claim 1, wherein the hooking up device further comprises a third hooking element (40) located at the upper part of the second chassis, said hooking element acting as a retaining element for the agricultural implement.

14. The hitch device for an implement according to claim 1, wherein the device for fixing the first chassis at the rear of the agricultural vehicle is a three-point lifting system L including at the bottom part, two hinged arms (7a, 7b) mounted at one of their ends on an axis of the agricultural vehicle and at the other of their ends on the first chassis, and at the top part a linking element (2) between the upper part of the first chassis and the agricultural vehicle, the arms (7a, 7b) being controlled by lifting means (3a, 3b).

15. The hitch device for an implement according to claim 1, cha wherein the second chassis includes two arms (81a, 81b) extending vertically and connected at their upper end by a body (84), their lower end being each slidably mounted along a pair of coaxial axes (60a, 60b) provided on the first chassis and extending in the vertical plane along the transverse direction, whereas the body (84) of the second chassis is extended by a retaining element (80) slidably mounted along an axis (60') provided on the first chassis and also extending in the vertical plane along the transverse direction.

16. The hitch device for an implement according to claim 15, wherein the free space between both arms of the second chassis defines a passage for the power cables of the means (82, 82a, 82b) for actuating the translation of the second chassis with respect to the first chassis, as well as for the mechanical drive line driving the agricultural implement.

17. The hitch device for an implement according to claim 1, cha wherein the second chassis includes two arms (81a, 81b) extending vertically and substantially connected at their middle part by a body (84), their lower and upper ends being each respectively slidably mounted along a pair of coaxial axes (60a, 60b, 60'a, 60'b) provided on the first chassis and extending in the vertical plane along the transverse direction.

18. The hitch device for an implement according to claim 1, wherein the means (82, 82a, 82b) for actuating the translation of the second chassis with respect to the first chassis comprise two single-acting jacks mounted on either side of the body of the second chassis.

19. The hitch device for an implement according to claim 1, wherein the means (82, 82a, 82b) for actuating the translation of the second chassis with respect to the first chassis comprise a double-acting jack mounted on one side of the second chassis.

20. The hitch device for an implement according to claim 1, further comprising a sensor C to identify the position of the second chassis with respect to the first chassis.

* * * * *